United States Patent
Patel et al.

(10) Patent No.: US 11,139,723 B2
(45) Date of Patent: Oct. 5, 2021

(54) ROTATING RECTIFIER ASSEMBLY

(71) Applicant: Hamilton Sundstrand Corporation, Charlotte, NC (US)

(72) Inventors: Dhaval Patel, Loves Park, IL (US); Glenn C. Lemmers, Jr., Loves Park, IL (US); Edward C. Allen, Davis, IL (US); Andrew R. Wilkinson, Cherry Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 884 days.

(21) Appl. No.: 15/651,396

(22) Filed: Jul. 17, 2017

(65) Prior Publication Data

US 2018/0316248 A1 Nov. 1, 2018

Related U.S. Application Data

(60) Provisional application No. 62/491,514, filed on Apr. 28, 2017.

(51) Int. Cl.
*H02K 11/042* (2016.01)
*H02K 11/04* (2016.01)
*H02M 7/00* (2006.01)

(52) U.S. Cl.
CPC .......... *H02K 11/042* (2013.01); *H02M 7/003* (2013.01)

(58) Field of Classification Search
CPC ..... H02K 11/04; H02K 11/042; H02K 11/046
See application file for complete search history.

(56) References Cited

U.S. PATENT DOCUMENTS

| 3,883,716 | A | | 5/1975 | Fortune |
| 4,794,510 | A | | 12/1988 | Wege |
| 5,006,741 | A | | 4/1991 | Schott |
| 5,012,145 | A | | 4/1991 | Frantz et al. |
| 5,136,195 | A | | 8/1992 | Allen, III et al. |
| 5,138,210 | A | * | 8/1992 | Crickmore ............ H01L 25/112 257/E25.025 |
| 5,773,903 | A | | 6/1998 | McCabria et al. |
| 5,796,196 | A | | 8/1998 | Johnsen et al. |
| 6,107,711 | A | | 8/2000 | Borchert |
| 6,580,187 | B2 | | 6/2003 | Bradfield |
| 6,661,135 | B2 | | 12/2003 | Borden et al. |
| 6,777,839 | B2 | | 8/2004 | Casey et al. |
| 6,914,357 | B2 | | 7/2005 | Tabatowski-Bush et al. |
| 7,166,943 | B2 | | 1/2007 | Johnsen |
| 7,400,117 | B1 | | 7/2008 | Rozman et al. |

(Continued)

*Primary Examiner* — Edgardo San Martin
(74) *Attorney, Agent, or Firm* — Carlson, Gaskey & Olds, P.C.

(57) ABSTRACT

A rectifier assembly according to an example of the present disclosure includes, among other things, a first housing and a second housing extending along an assembly axis, the first housing surrounding a pair of electrical rings. At least one spring strip includes a first spring strip portion transverse to a second spring strip portion, the second spring strip portion to bias diodes against an inner periphery of the pair of electrical rings. The second housing includes at least one connection terminal for receiving a wire from an exciter rotor, the at least one connection terminal including a screw threaded area which receives a bolt holding the first spring strip portion. A generator and a method of assembling a rectifier assembly are also disclosed.

22 Claims, 13 Drawing Sheets (56) References Cited

U.S. PATENT DOCUMENTS

| | | | |
|---|---|---|---|
| 7,486,053 B2 | 2/2009 | Qi et al. | |
| 7,511,392 B2 | 3/2009 | Rubbo et al. | |
| 7,944,100 B2 | 5/2011 | Lemmers, Jr. et al. | |
| 8,030,821 B2 * | 10/2011 | Ganong | F16C 3/02 |
| | | | 29/598 |
| 9,035,507 B2 * | 5/2015 | Wirsch, Jr. | H02K 11/04 |
| | | | 310/68 D |
| 9,035,508 B2 * | 5/2015 | Grosskopf | H02K 11/27 |
| | | | 310/71 |
| 9,369,029 B2 * | 6/2016 | Hasan | H02K 41/0356 |
| 10,103,604 B2 * | 10/2018 | Chitsaz | H02K 11/042 |
| 10,460,861 B1 * | 10/2019 | Patel | H02K 19/36 |
| 2006/0176720 A1 * | 8/2006 | Lemmers, Jr. | H01L 25/11 |
| | | | 363/145 |
| 2006/0284499 A1 | 12/2006 | Rubbo et al. | |
| 2007/0108854 A1 | 5/2007 | Osborn et al. | |
| 2010/0283357 A1 | 11/2010 | Lemmers, Jr. et al. | |

\* cited by examiner

ROTATING RECTIFIER ASSEMBLY

CROSS-REFERENCE TO RELATED APPLICATION

The present disclosure claims priority to U.S. Provisional Patent Application No. 662/491,514, filed Apr. 28, 2017.

BACKGROUND

This disclosure relates to a rectifier assembly for a generator, wherein the rectifier assembly is easily assembled.

Generators are known, and typically include a generator rotor having main field windings that are driven to rotate by a source of rotation. As an example, a generator may be driven to rotate by the output of a gas turbine engine. In typical generator operation, a flow of current is supplied to the main field windings. The main field windings rotate adjacent to a stator, and electricity is generated, and used for various purposes.

In one known type of generator, an exciter rotor rotates adjacent to a stator, and generates voltage to be delivered to the main field windings as a voltage to facilitate the main generation of electricity.

The voltage generated by the exciter rotor is typically an AC current and a rectifier is utilized to transform that AC voltage into a DC voltage for use by the main field windings. In the past, the rectifiers have been somewhat difficult to assemble.

SUMMARY

A rectifier assembly according to an example of the present disclosure includes a first housing and a second housing extending along an assembly axis, the first housing surrounding a pair of electrical rings. At least one spring strip includes a first spring strip portion transverse to a second spring strip portion, the second spring strip portion to bias diodes against an inner periphery of the pair of electrical rings. The second housing includes at least one connection terminal for receiving a wire from an exciter rotor, the at least one connection terminal including a screw threaded area which receives a bolt holding the first spring strip portion.

A generator according to an example of the present disclosure includes a shaft defining a longitudinal axis, a main stator and a main winding, an exciter rotor and an exciter winding, the main winding and the exciter winding rotatable with the shaft, and a rectifier assembly in communication with the exciter rotor and the main winding, and received in a bore in the shaft. The rectifier assembly includes a first housing and a second housing, the first housing surrounding a pair of electrical rings, and a plurality of spring strips each including a first spring strip portion transverse to a second spring strip portion, the second spring strip portion to bias diodes against an inner periphery of the pair of electrical rings. The second housing includes a plurality of connection terminals, each of the plurality of connection terminals receiving a wire from the exciter rotor, and includes a screw threaded area which receives a bolt holding the first spring strip portion of a respective one of the plurality of spring strips.

A method of assembling a rectifier assembly according to an example of the present disclosure includes the steps of providing a plurality of spring strips each including a first spring strip portion transverse to a second spring strip portion, securing each first spring strip portion to a respective connection terminal, the connection terminal received in a first housing that defines an assembly axis, moving a pair of electrical rings and a pair of insulator rings along the assembly axis, and securing the second spring strip portion to the pair of insulator rings such that the second spring strip portion biases diodes against an inner periphery of the pair of electrical rings.

These and other features of the present invention can be best understood from the following specification and drawings, the following of which is a brief description.

DETAILED DESCRIPTION

Figure 1:
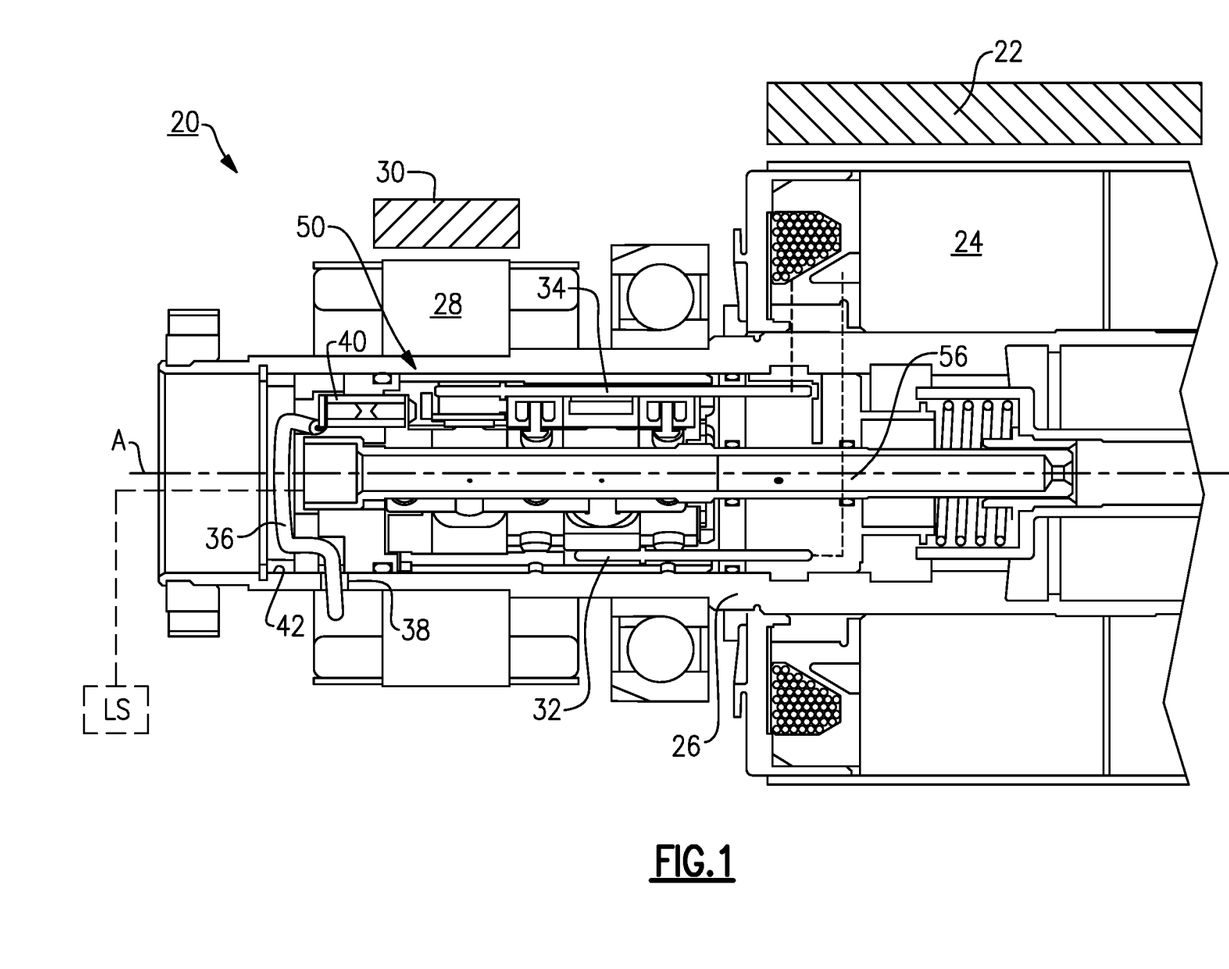
FIG. 1 is a cross-sectional view through a generator.

FIG. 1 shows a generator 20 incorporating a main stator 22 adjacent to main field windings 24. A generator shaft 26 is driven to rotate by a source of rotation, which can be a gas turbine engine, for example. The generator shaft 26 is rotatable about a longitudinal axis A. An exciter rotor 28 is mounted on the generator shaft 26, and rotates adjacent to an exciter stator 30. As known, rotation of the exciter rotor 28 generates an AC current, which is delivered to the main field windings 24 through DC connector pins 32, 34. Connections are shown schematically between the connector pins 32, 34 and the main field windings 24. This portion of the disclosure is as known in the art. Wires 36 (one shown) pass through slots 38 (one shown), which provide access to an inner bore 42 in the generator shaft 26. The wires 36 are connected to respective electrical connection terminals 40 (one shown) with fasteners. The detail of the generator shaft 26 and the slots 38 disclosed in U.S. patent application Ser. No. 12/436,161, filed on May 6, 2009 and entitled "Generator Rotor with Improved Hollow Shaft," incorporated herein by reference.

A rectifier assembly 50 is disposed within the inner bore 42 of the generator shaft 26 for co-rotation about the longitudinal axis A. The rectifier assembly 50 provides a rectification function for converting AC voltage to DC voltage. In the illustrated example, the rectifier assembly 50 rectifies three phase AC voltage. Other systems can benefit from the teachings herein, including rectification of fewer or greater than three phases of AC voltage, such as single phase rectification.

Figure 2:
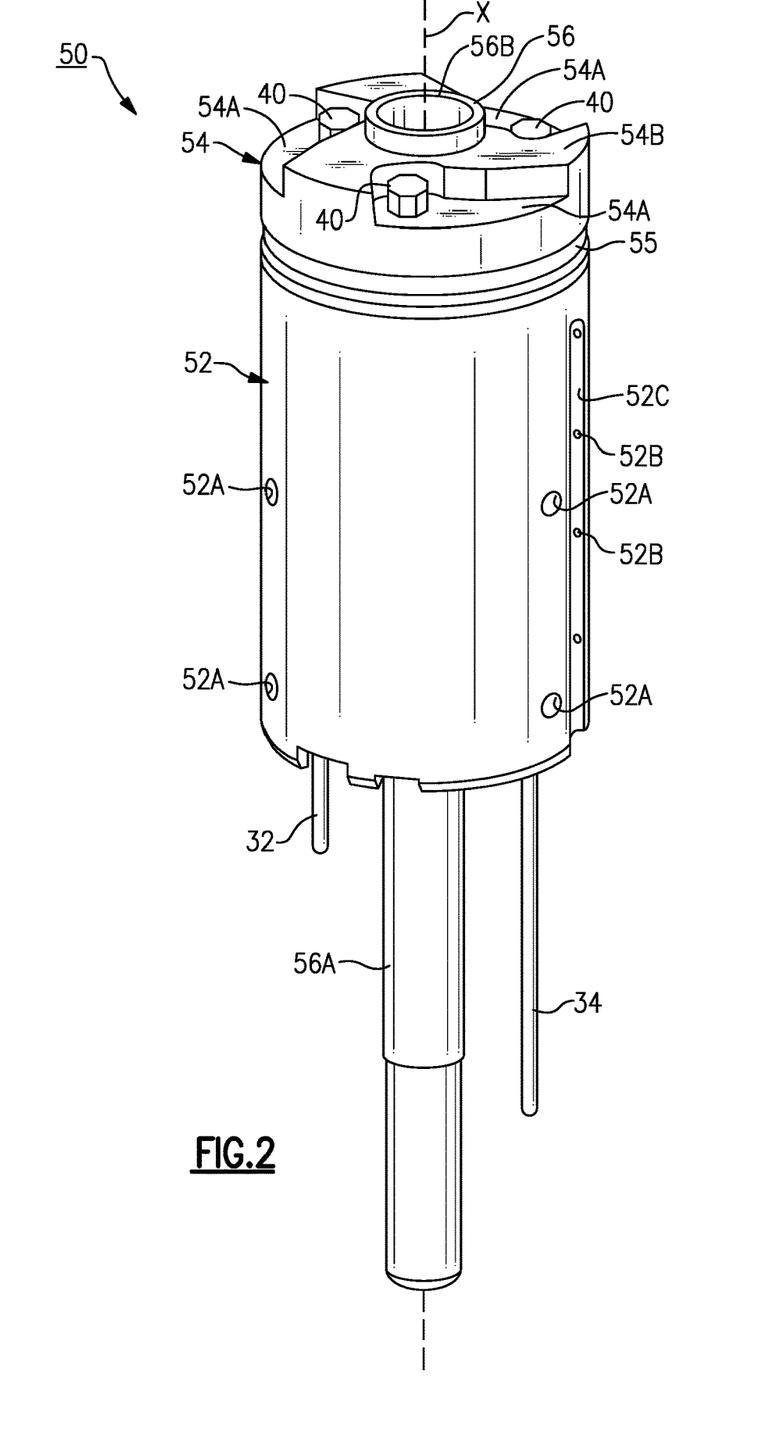
FIG. 2 is a perspective view of a rectifier assembly.

FIG. 2 illustrates the rectifier assembly 50 in an assembled condition. The rectifier assembly 50 includes a first (or DC) housing 52 and a second (or AC) housing 54 extending along an assembly axis X. The assembly axis X can be collinear with the longitudinal axis A of the generator shaft 26. The first and second housings 52, 54 can have a complementary geometry with respect to the inner bore 42 of the generator shaft 26, such as a generally cylindrical profile. An O-ring or seal 55 can be disposed in a race 57 (FIG. 9) defined in an outer periphery of the second housing 54 to establish a sealing relationship with the inner bore 42.

The first housing 52 defines a plurality of housing apertures 52A that each extend through a thickness of the first housing 52. The housing apertures 52A can allow access to fasteners or other components located within an interior of the first housing 52. The first housing 52 can define a plurality of openings 52B along a groove 52C for circulating lubricant, for example.

The pair of connector pins 32, 34 extend outwardly from the first housing 52 in a direction that is substantially parallel to the assembly axis X. The connector pins 32, 34 provide positive and negative electrical connections for providing DC voltage from the rectifier assembly 50 and the main field windings 24 (FIG. 1). Once the electrical connections are made, current can flow from the exciter rotor 28 to the main field windings 24 via the rectifier assembly 50.

The first and second housings 52, 54 can be configured to receive a hallow transfer tube or lubrication conduit 56 disposed along the assembly axis X. The lubrication conduit 56 includes an elongated portion 56A and a head portion 56B that can extend outwardly of the rectifier assembly 50. The lubrication conduit 56 can be in fluid communication with a lubrication source LS (shown in dashed lines in FIG. 1) for supplying and/or returning lubrication with one or more components of the generator 20 including the rectifier assembly 50. It should be understood that the lubrication conduit 56 need not be part of the rectifier assembly 50, and that further, if it is inserted into the rectifier assembly 50, the lubrication conduit 56 can be inserted after various fasteners are tightened.

Figure 3:
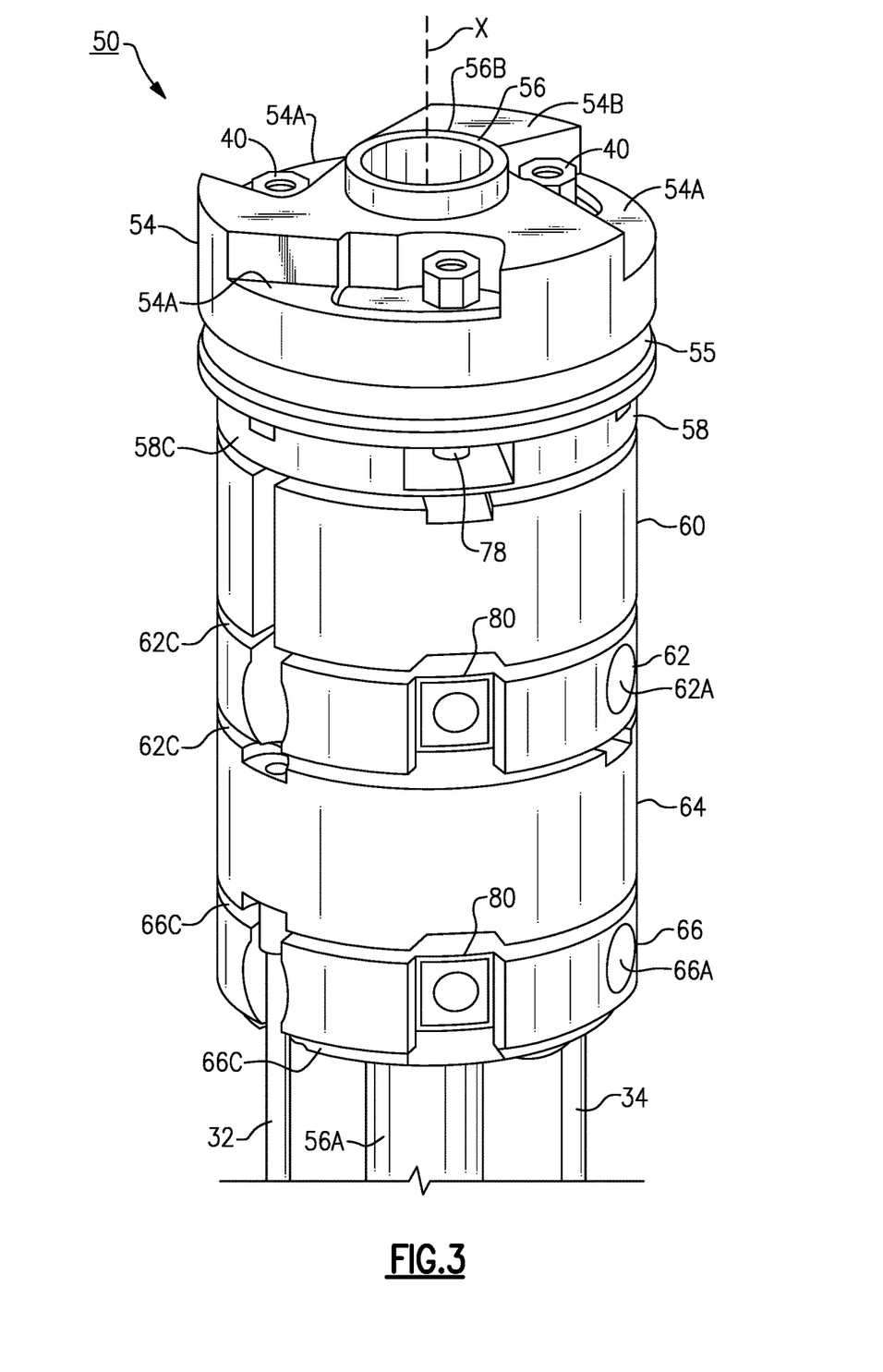
FIG. 3 is a perspective view of the rectifier assembly of FIG. 2 with a first housing removed.
Figure 4:
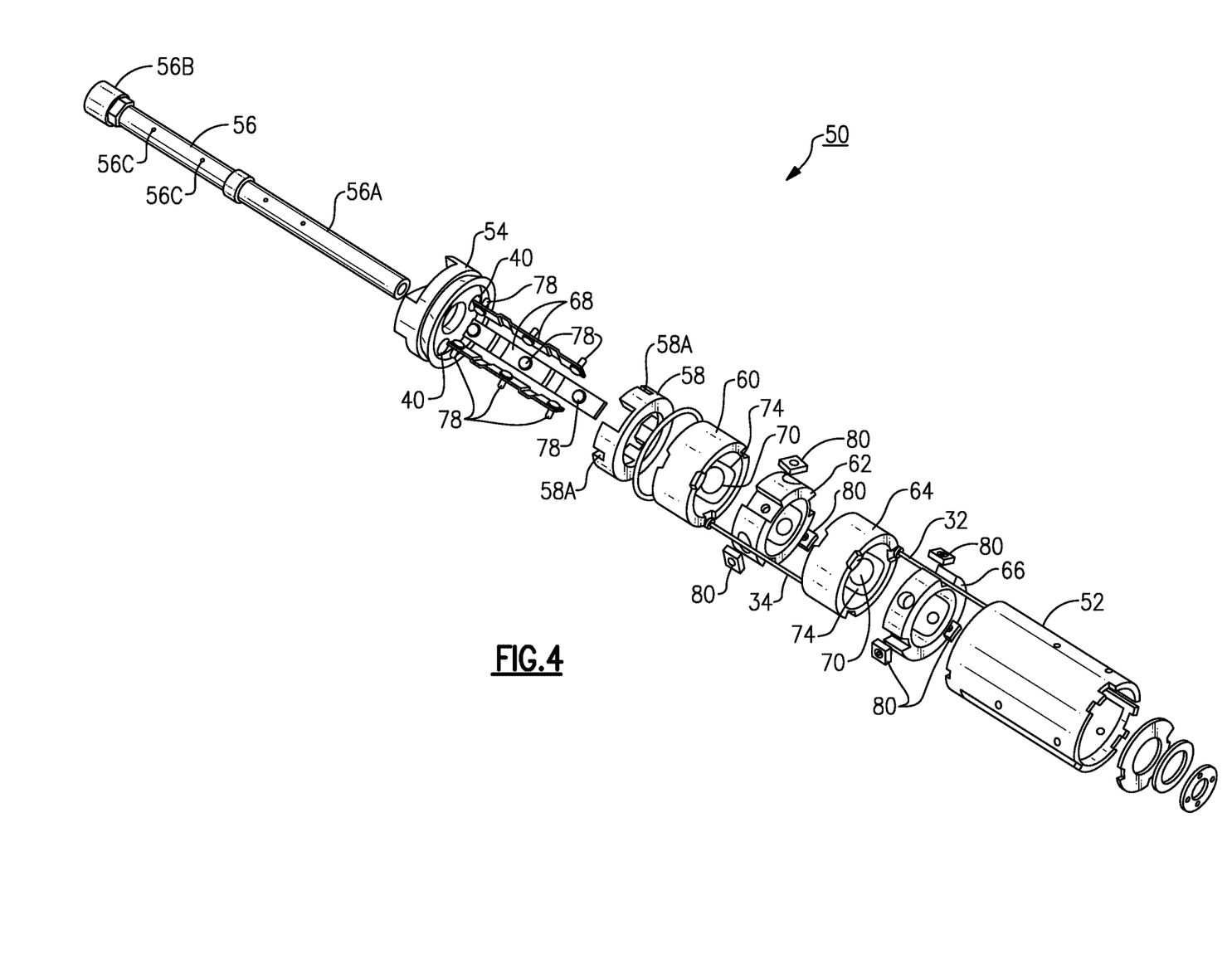
FIG. 4 is an exploded view of the rectifier assembly.
Figure 5A:
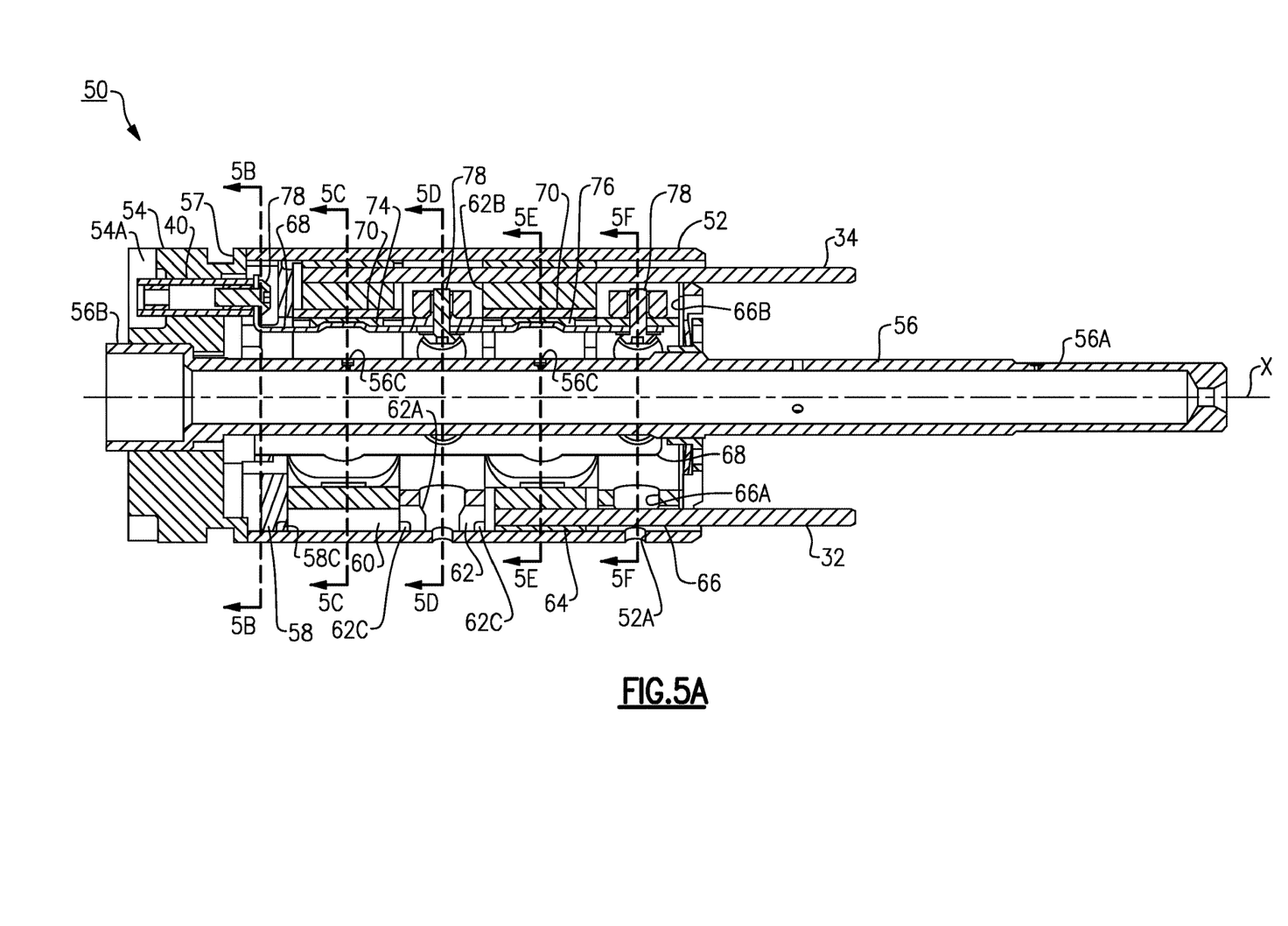
FIG. 5A is a sectional view of the rectifier assembly.
Figure 5B:
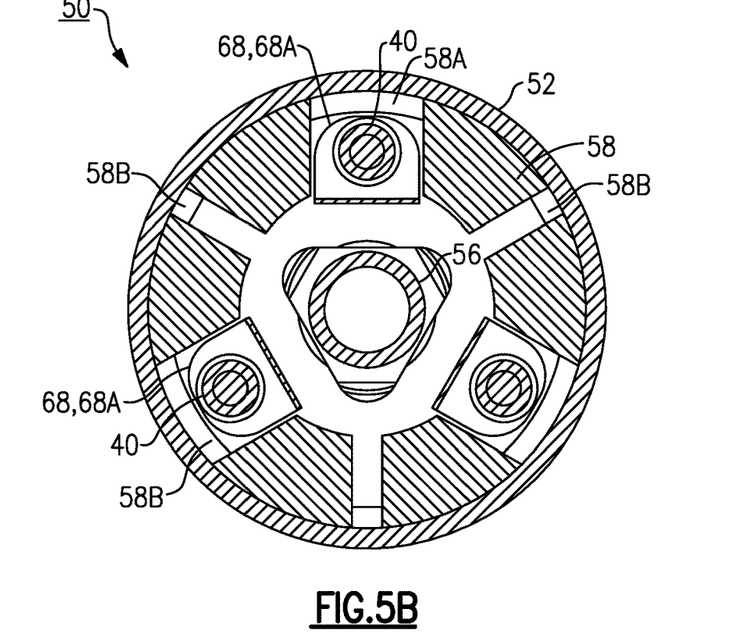
FIG. 5B is a sectional view of the rectifier assembly of FIG. 5A taken along line 5B-5B.
Figure 6:
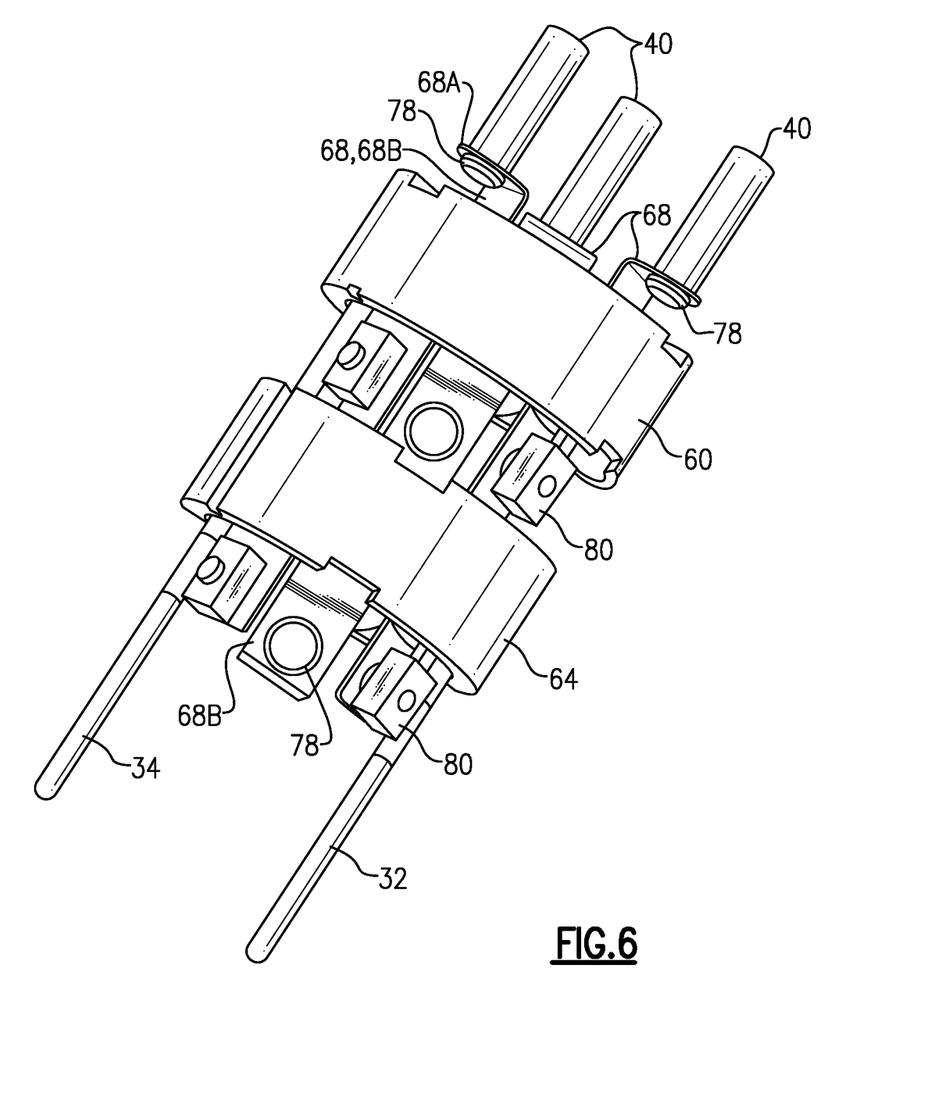
FIG. 6 shows various electrical components of the rectifier assembly.
Figure 7:
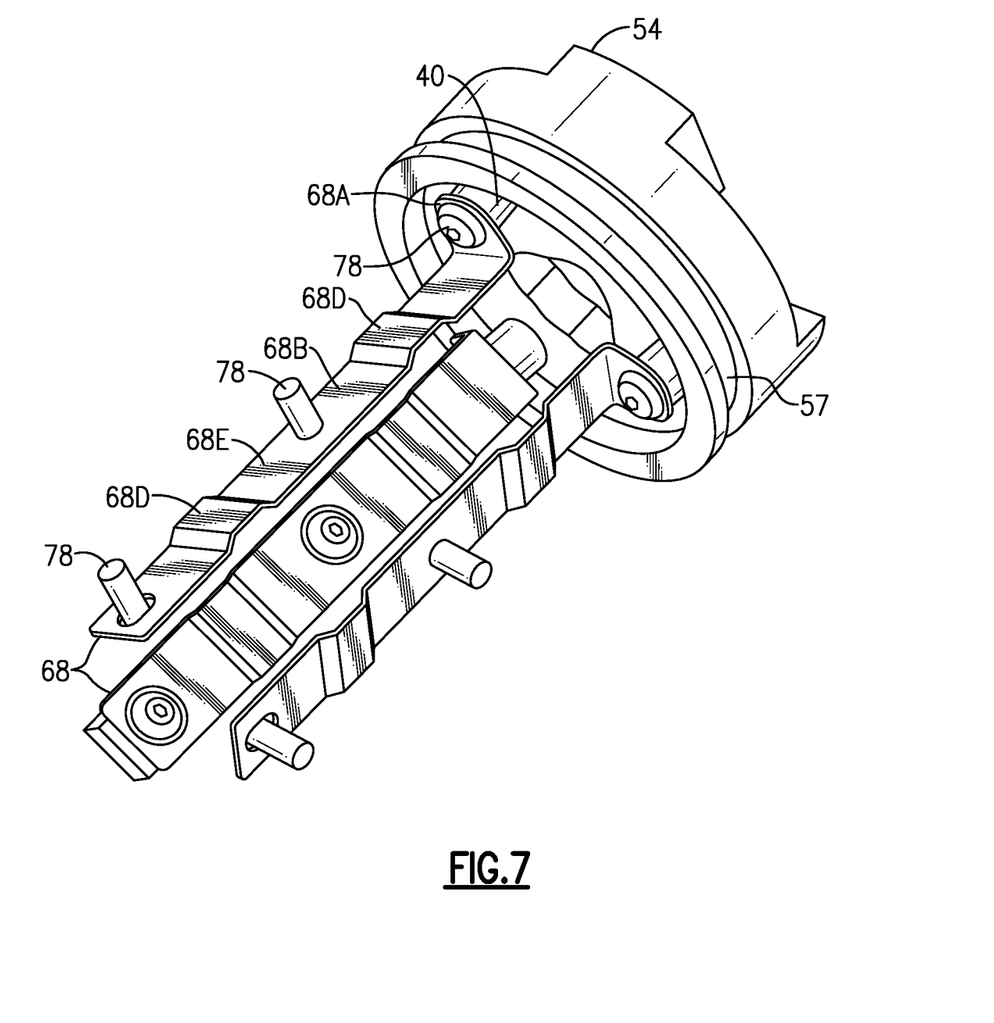
FIG. 7 shows a view of the AC housing with spring strips.

FIG. 3 illustrates the rectifier assembly 50 without the first housing 52 of FIG. 2. FIG. 4 is an exploded view of the rectifier assembly 50, and FIG. 5A illustrates a sectional view of the rectifier assembly 50 along the assembly axis X. FIGS. 5B to 5F illustrate sectional views of the rectifier assembly 50 of FIG. 5A taken at various locations along the assembly axis X. FIG. 6 shows the electrical components of the rectifier assembly 50. FIG. 7 shows another view of the rectifier assembly of FIG. 6 with some of the electrical components of the rectifier assembly 50 omitted for illustrative purposes.

Referring to FIGS. 3 to 6, with continued reference to FIG. 2, the rectifier assembly 50 includes a first insulator ring 58, a first electrical ring 60, a second (or mounting) insulator ring 62, a second electrical ring 64, and a third (or mounting) insulator ring 66 arranged in a stack formation along the assembly axis X. Each of the insulator rings 58, 62, 66 and the electrical rings 60, 64 can have a generally cylindrical profile which complements an inner periphery of the first housing 52. The insulator rings 58, 62, 66 are formed of a non-conductive material such as plastic, for example. The electrical rings 60, 64 can be made of a conductive metal or metal alloy such as copper, iron or nickel. FIG. 7 shows the electrical components of the rectifier assembly 50 with the insulator rings 58, 62, 66 and the electrical rings 60, 64 omitted for illustrative purposes.

Figure 11:
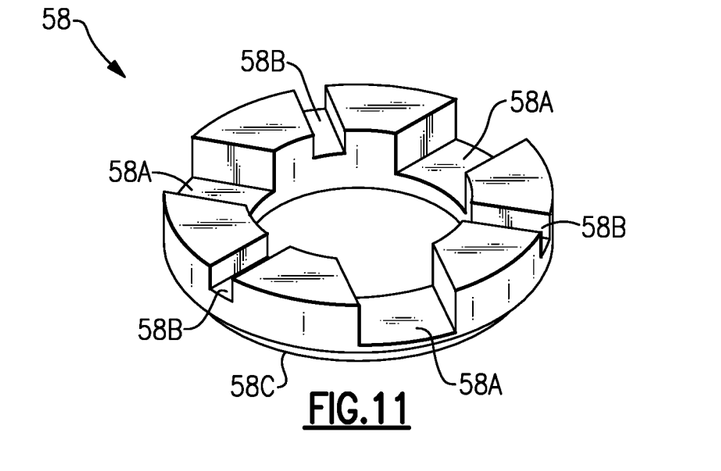
FIG. 11 is a perspective view of an insulator.

The first insulator ring 58 includes a first set of radially extending slots 58A and a second set of radially extending slots 58B bounded by an inner periphery of the first housing 52, as illustrated by FIG. 11. Each of the slots 58A receives a portion of one of the connection terminals 40. Each of the slots 58B can be utilized for communicating lubricant between various components of the rectifier assembly 50. The first insulator ring 58 defines a generally circumferential slot 58C for communicating lubricant with the openings 52B of the first housing 52.

The second and third insulator rings 62, 66 define respective insulator apertures or holes 62A, 66A and slots 62B, 66B as discussed in detail below. The second and third insulator rings 62, 66 define generally sets of circumferential slots 62C, 66C for communicating lubricant with the openings 52B of the first housing 52 (see FIG. 3). Formation of the circumferential slot 58C, 62C, 66C in the second and third insulator rings 62, 66 can simplify fabrication of the first housing 52 which may otherwise have channels formed in an inner periphery for communicating lubricant. The second and third insulator rings 62, 66 can be identical in geometry to reduce parts count and system complexity.

The rectifier assembly 50 includes a plurality of electrical bus bars springs or spring strips 68 mechanically attached to the connection terminals 40. In the illustrated example of FIG. 4, the rectifier assembly 50 includes three spring strips 68 each for receiving a phase of AC current. The three spring strips 68 can be spaced circumferentially about the assembly axis X, with three connection terminals 40 each associated with a respective one of the three spring strips 68. In other examples, the rectifier assembly 50 has fewer or more than three spring strips 68 each operatively coupled to a respective connection terminal 40. The second housing 54 is shown with portions of the connection terminals 40 disposed therein and adjacent to the spring strips 68. The spring strips 68 can be made of a flexible, conductive metal or metal alloy such as copper, aluminum or beryllium copper.

Figure 5C:
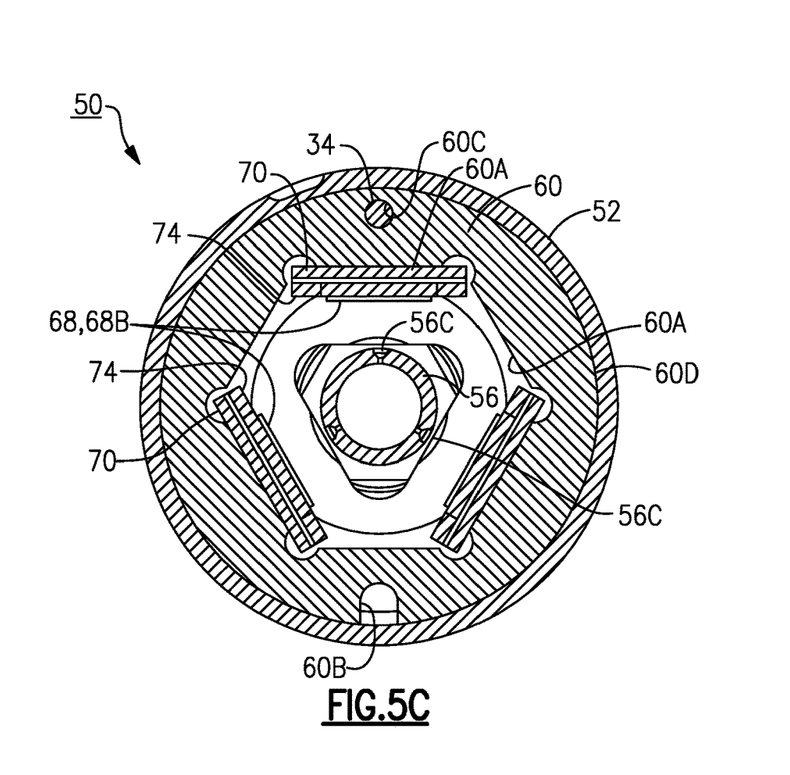
FIG. 5C is a sectional view of the rectifier assembly of FIG. 5A taken along line 5C-5C.
Figure 5D:
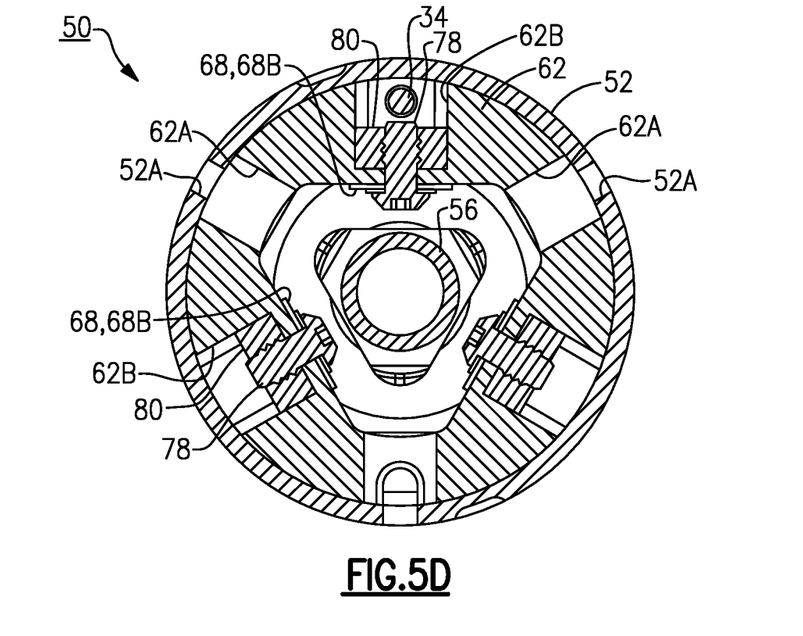
FIG. 5D is a sectional view of the rectifier assembly of FIG. 5A taken along line 5D-5D.
Figure 5E:
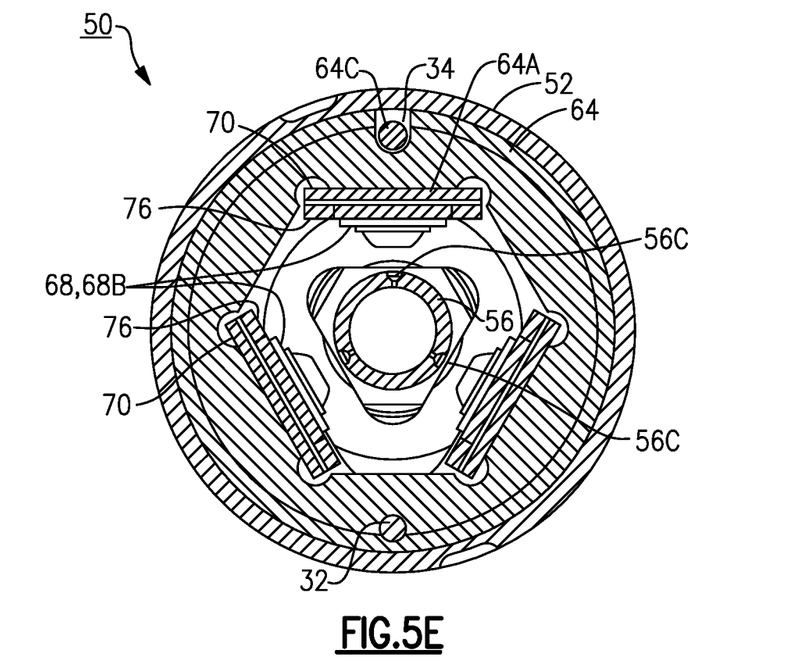
FIG. 5E is a sectional view of the rectifier assembly of FIG. 5A taken along line 5E-5E.
Figure 5F:
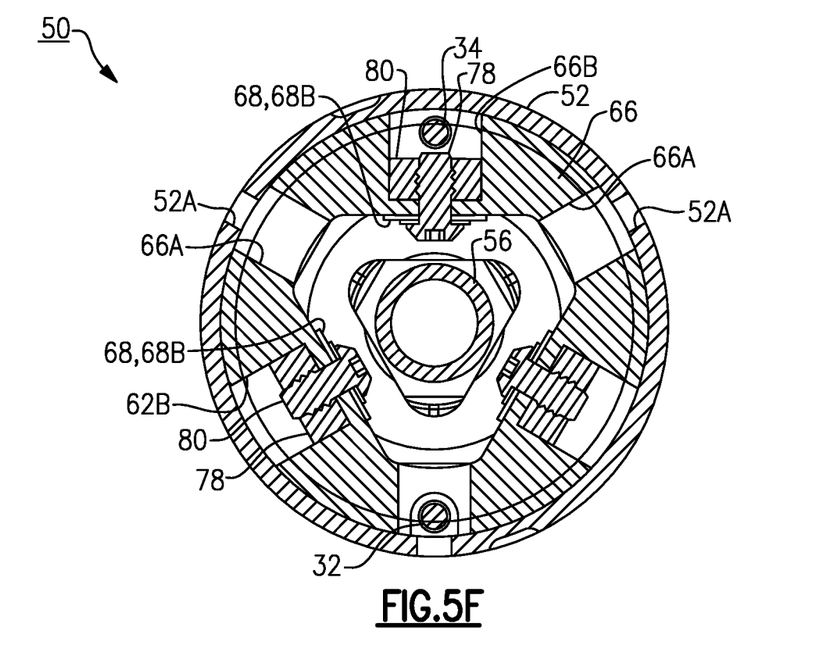
FIG. 5F is a sectional view of the rectifier assembly of FIG. 5A taken along line 5F-5F.

The spring strips 68 are operable to communicate voltage to one or more diodes 70 (see FIGS. 5A, 5C and 5E). The rectifier assembly 50 includes six diodes 70 to provide rectification of three phase AC voltage. In an alternative example, the rectifier assembly 50 can include two diodes 70 to provide single phase rectification of AC current. The diodes 70 are disposed in respective first and second electrical rings 60, 64 and are abut against a respective set of first and second diode insulators 74, 76. When the rectifier assembly 50 is assembled, the electrical rings 60, 64 provide positive and negative rails for communicating DC current to the connector pins 32, 34 that has been rectified by the diodes 70.

Figure 8:
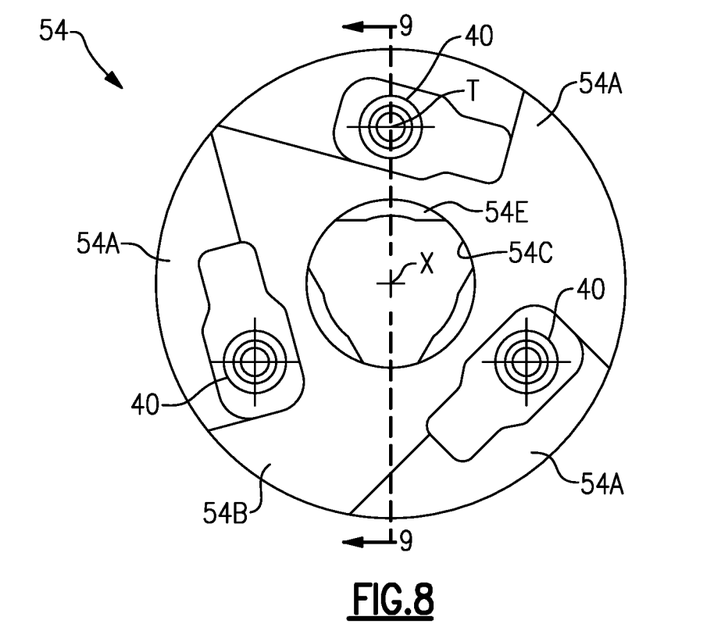
FIG. 8 is an axial view of a second housing.
Figure 9:
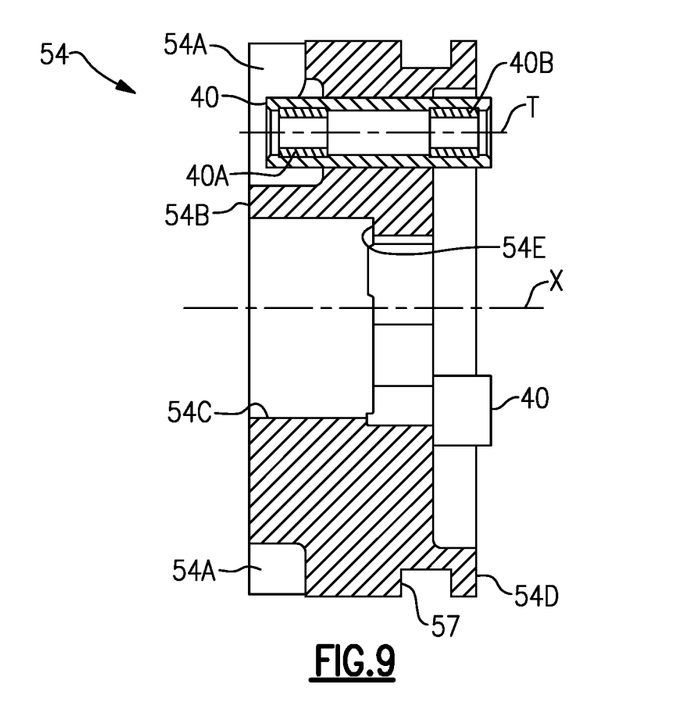
FIG. 9 is a sectional view of the second housing of FIG. 8 taken along line 9-9.

Referring to FIGS. 8 and 9, the second housing 54 and connection terminals 40 are shown. The second housing 54 can include recesses 54A for locating the connection terminals 40 inwardly from a first end 54B of the second housing 54. The second housing 54 defines a central bore 54C extending along the assembly axis X between the first end MB and a second, opposed end MD. The central bore 54C is configured to receive the elongated portion 56A of the lubrication conduit 56, and a ledge 54E provides a stop for the head portion 56B of the lubrication conduit 56 (FIG. 4). This arrangement of the second housing 54 can assist in properly positioning the lubrication conduit 56 relative to the remainder of the rectifier assembly 50 such that lubrication holes 56C in the lubrication conduit 56 are aligned with the diodes 70 (see FIGS. 5A, 5C and 5E).

Each connection terminal 40 can be an elongated bushing that is molded in, press fit, adhered, or otherwise fixedly attached to, the second housing 54. By securing each connection terminal 40 to the second housing 54, assembly of the rectifier assembly 50 can be simplified by maintaining each spring strip 68 at a desired position and orientation to reduce a likelihood of tipping, movement or misalignment during assembly of the other components of the rectifier assembly 50. Molding the connection terminal 40 into the second housing 54 also reduces a parts count of the overall rectifier assembly 50. Also, the arrangement of the connection terminals 40 relative to the second housing 54 can reduce the need for providing openings in the first and/or second housings 52, 54 for tensioning fasteners securing the spring strips 68 to the connection terminals 40 once the first and second housings 52, 54 are brought into abutment.

Each connection terminal 40 includes a first screw threaded area 40A at a first end and a second screw threaded area 40B at a second, opposed end, as illustrated by FIG. 9. The first screw threaded area 40A receives a terminal bolt attached to a wire 36 (FIG. 1). The second screw threaded area 40B receives a terminal bolt holding a first spring portion 68A of one of the spring strips 68 (see FIG. 7). Each connection terminal 40 defines a terminal axis T that can be substantially parallel to the assembly axis X, with each of the screw threaded areas 40A, 40B being defined along the terminal axis T. An outer perimeter of the first housing 52 can surround a head of each bolt 78 mating with the second screw threaded area 40B when in the installed position (see FIG. 5).

Figure 10:
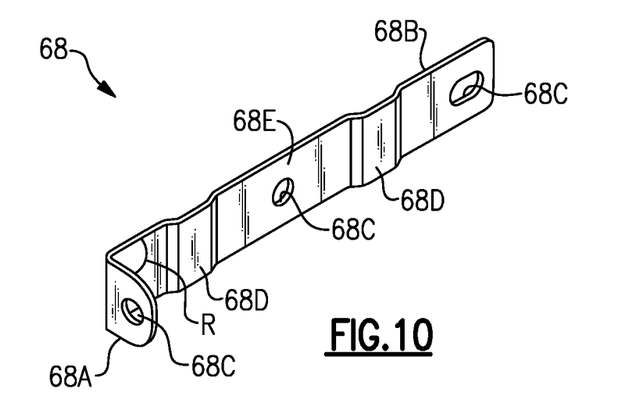
FIG. 10 illustrates a spring strip.

Referring to FIG. 10, with continued reference to FIGS. 3 to 7, each spring strip 68 has a generally L-shaped profile and includes a first spring portion 68A transverse to an elongated second spring portion 68B. Each of the spring strips 68 define a plurality of apertures 68C for carrying fasteners or bolts 78, including one bolt associated with a respective connection terminals 40 and two other mounting bolts associated with nuts 80 received in the second and third insulator rings 62, 66. The second and third insulator rings 62, 66 define respective holes 62A, 66A to allow access to an opposed bolt 78 and respective slots 62B, 66B to receive and hold nuts 80, as illustrated by FIGS. 5D and 5F. The holes 62A, 66A are generally aligned with housing apertures 52A of the first housing 52A when in the installed position (see FIG. 5A).

The second spring portion 68B of each spring strip 68 defines a pair of ledges 68D that extend outwardly from a face 68E of the second spring portion 68B to abut and bias a pair of the diodes 70 against an inner periphery 60A/64A of the electrical rings 60, 64 (FIGS. 12 and 13), as illustrated by FIGS. 5A, 5C and 5E. The ledges 68D are defined intermediate a location of the apertures 68A and the respective bolts 78.

The first spring portion 68A and the second spring portion 68B establish an angle R. In the illustrated example, the angle R is approximately 90 degrees. In other examples, the angle R can between about 75 to 105 degrees to provide a desired amount of pre-loading of the spring strip 68 when the spring strips are fastened to the connection terminals 40 and the second and third insulator rings 62, 66.

Figure 12:
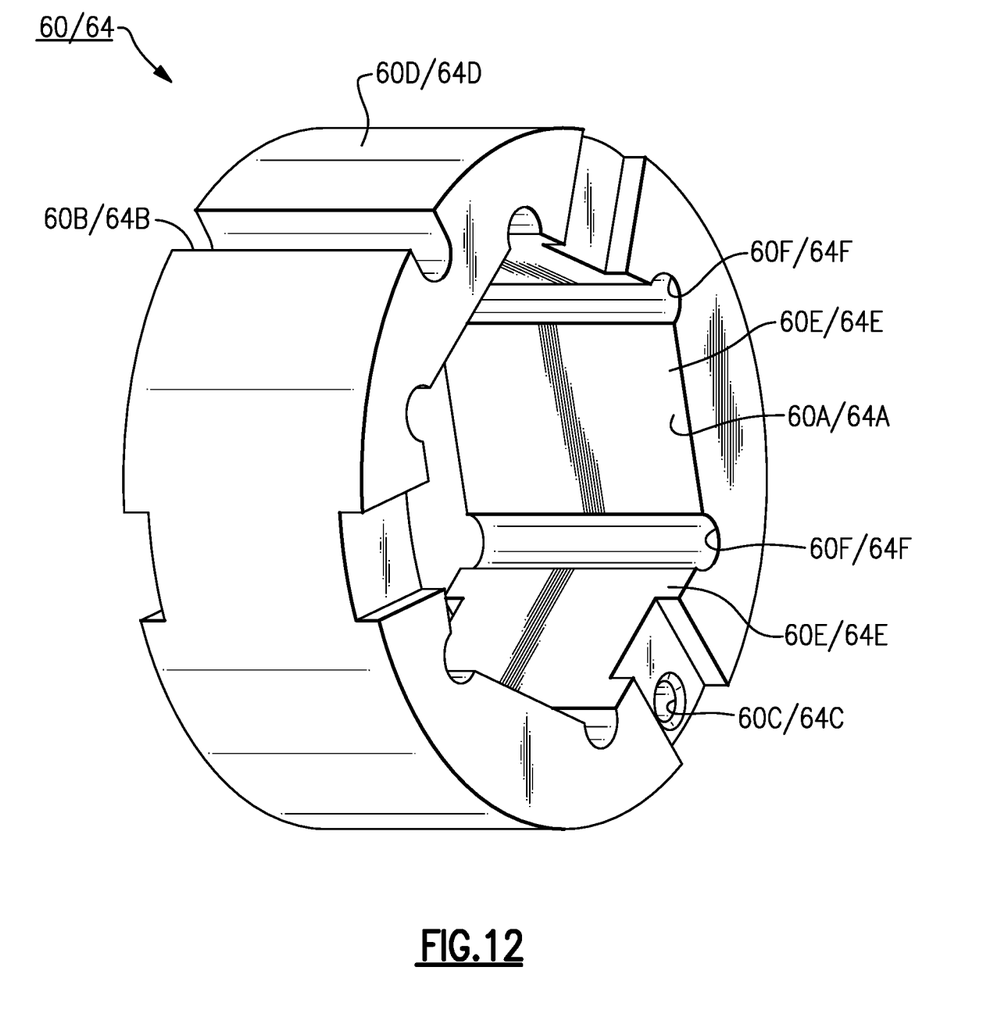
FIG. 12 is a perspective view of an electrical ring.
Figure 13:
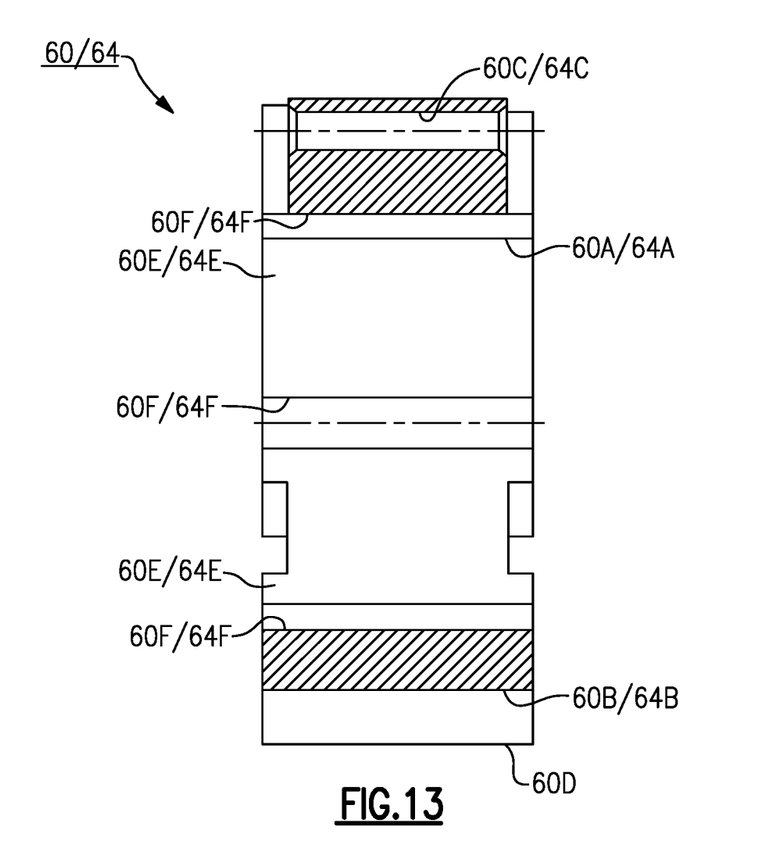
FIG. 13 is a sectional view of the electrical ring of FIG. 12.

FIGS. 12 and 13 illustrate an isolated view of one of the first and second electrical rings 60/64. The first and second electrical rings 60, 64 can be identical in geometry to reduce parts count and system complexity. As shown, the inner periphery 60A/64A of each electrical ring 60/64 has a generally hexagonal profile which defines flat surfaces 60E/64F for receiving a diode 70 (FIG. 5A) and curved portions 60F/64F formed circumferentially between the flat surfaces 60E/64F.

The electrical ring 60/64 defines a groove or slot 60B/64B along an outer periphery 60D/64D for receiving one of the connector pins 32, 34. The electrical ring 60/64 defines a ring passage 60C/64C in a thickness of the electrical ring 60/64 for receiving one of the connector pins 32, 34. The slot 60B/64B of one of the electrical rings 60/64 and the ring passage 60C/64C of another one of the electrical rings 60/64 can be circumferentially aligned relative to the assembly axis X to receive a single one of the connector pins 32, 34 spanning between the electrical rings 60, 64 when the electrical rings 60, 64 are located in the installed position, as illustrated by FIG. 5A.

The rectifier assembly 50 can be assembled as follows. The second housing 54 is provided with connection terminals 40 molded or otherwise secured to the second housing 54. The first spring portion 68A of each spring strip 68 is mechanically attached or otherwise secured to a respective one of the connection terminals 40 with a bolt 78 such that the second spring portion 68B of each spring strip 68 extends in a direction that is substantially parallel to the assembly axis X and are held rigid during assembly.

The first insulator ring 58, first electrical ring 60, second insulator ring 62, second electrical ring 64 and third insulator ring 66 are sequentially loaded onto the spring strips 68 or otherwise moved along the assembly axis X toward the second housing 54, with the electrical rings 60, 64 carrying the diodes 70. The connector pins 32, 34 can be positioned in the slots 60B, 64B and ring passages 60C, 64C of the electrical rings 60, 64 while stacking the insulator rings 58, 62, 66 and electrical rings 60, 64, or thereafter. The connector pins 32, 34 can be press fit, soldered or welded into the ring passages 60C, 64C, for example, to secure the connector pins 32, 34 in the rectifier assembly 50.

The second spring portion 68B of each spring strip 68 is mechanically attached or otherwise secured to the second and third insulator rings 62, 66 with bolts 78 such that the second spring portion 68B biases the diodes 70 against the inner peripheries 60E, 64E of the electrical rings 60, 64. The first housing 52 is moved along the assembly axis X and into abutment with the second housing 54 to enclose the insulator rings 58, 62, 66 and electrical rings 60, 64. Thereafter, the bolts 78 can be tightened with a tool by accessing the housing apertures 52A of the first housing 52, which are circumferentially and axially aligned with the holes 62A, 66A of the second and third insulator rings 62, 66. The lubrication conduit 56 can be moved along the assembly axis X and at least partially in the first and second housings 52, 54.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A rectifier assembly comprising:
   a first housing and a second housing extending along an assembly axis, the first housing surrounding a pair of electrical rings;
   at least one spring strip including a first spring strip portion transverse to a second spring strip portion such that the at least one spring strip has an L-shaped profile, the second spring strip portion to bias diodes against an inner periphery of the pair of electrical rings; and wherein the second housing includes at least one connection terminal for receiving a wire from an exciter rotor, the at least one connection terminal including a screw threaded area which receives a bolt holding the first spring strip portion.

2. The rectifier assembly as set forth in claim 1, wherein the at least one connection terminal is molded in the second housing.

3. The rectifier assembly as set forth in claim 2, wherein the at least one connection terminal is an elongated bushing.

4. The rectifier assembly as set forth in claim 3, wherein the at least one connection terminal defines a terminal axis that is substantially parallel to the assembly axis, the screw threaded area being defined along the terminal axis.

5. The rectifier assembly as set forth in claim 1, wherein an outer perimeter of the first housing surrounds a head of the bolt.

6. The rectifier assembly as set forth in claim 1, wherein the second spring strip portion extends axially with respect to the assembly axis, carries two mounting bolts, and has outwardly extending ledges intermediate a location of the mounting bolts, each of the ledges abutting against one of the diodes.

7. The rectifier assembly as set forth in claim 6, comprising:
a pair of insulator rings between the pair of electrical rings, the pair of insulator rings receiving the mounting bolts, and including slots at an outer periphery to receive nuts into which the mounting bolts are tightened; and
wherein each of the pair of insulator rings defines insulator apertures substantially aligned with housing apertures defined in the first housing to allow access to the mounting bolts.

8. The rectifier assembly as set forth in claim 1, wherein the at least one spring strip includes three spring strips spaced circumferentially about the assembly axis, and the at least one connection terminal includes three connection terminals each associated with a respective one of the three spring strips.

9. The rectifier assembly as set forth in claim 1, wherein the second housing defines a central bore extending along the assembly axis, the central bore configured to receive a lubrication conduit.

10. The rectifier assembly as set forth in claim 1, wherein each of the pair of electrical rings defines a ring passage and a slot along an outer periphery, the ring passage of one of pair of electrical rings and the slot of another one of the pair of electrical rings aligned to receive a connector pin when in an installed position.

11. A generator comprising:
a shaft defining a longitudinal axis;
a main stator and a main field winding;
an exciter rotor and an exciter winding, the main field winding and the exciter winding rotatable with the shaft;
a rectifier assembly in communication with the exciter rotor and the main field winding, and received in a bore in the shaft, the rectifier assembly comprising:
a first housing and a second housing, the first housing surrounding a pair of electrical rings;
a plurality of spring strips each including a first spring strip portion transverse to a second spring strip portion such that the respective spring strip has an L-shape profile, the second spring strip portion to bias diodes against an inner periphery of the pair of electrical rings; and
wherein the second housing includes a plurality of connection terminals, each of the plurality of connection terminals receiving a wire from the exciter rotor, and including a screw threaded area which receives a bolt holding the first spring strip portion of a respective one of the plurality of spring strips.

12. The generator as set forth in claim 11, wherein each of the plurality of connection terminals is an elongated bushing molded in the second housing.

13. The generator as set forth in claim 12, wherein the plurality of spring strips includes three spring strips spaced circumferentially about the longitudinal axis, and the plurality of connection terminals includes three connection terminals each associated with a respective one of the three spring strips.

14. The generator as set forth in claim 13, wherein the first housing and the second housing extend along the longitudinal axis, and each of the plurality of connection terminals defines a terminal axis that is substantially parallel to the longitudinal axis, the screw threaded area being defined along the terminal axis.

15. The generator as set forth in claim 13, wherein an outer perimeter of the first housing surrounds a head of the bolt.

16. The generator as set forth in claim 11, comprising a pair of connector pins, wherein each of the pair of electrical rings defines a ring passage and a slot along an outer periphery, and each of the pair of connector pins is received in the ring passage of one of the pair of electrical rings and the slot of another one of the pair of electrical rings when in an installed position.

17. The generator as set forth in claim 11, wherein the second spring strip portion extends axially with respect to the longitudinal axis, carries two mounting bolts, and has outwardly extending ledges intermediate a location of the mounting bolts, each of the ledges abutting against one of the diodes.

18. The generator as set forth in claim 11, wherein the second housing defines a central bore extending along the longitudinal axis, the central bore configured to receive a lubrication conduit in fluid communication with a lubrication source.

19. A method of assembling a rectifier assembly comprising the steps of:
providing a plurality of spring strips each including a first spring strip portion transverse to a second spring strip portion such that the respective spring strip has an L-shaped profile;
securing each first spring strip portion to a respective connection terminal, the connection terminal received in a first housing that defines an assembly axis;
moving a pair of electrical rings and a pair of insulator rings along the assembly axis; and
securing the second spring strip portion to the pair of insulator rings such that the second spring strip portion biases diodes against an inner periphery of the pair of electrical rings.

20. The method as set forth in claim 19, wherein each of the pair of electrical rings defines a ring passage and a slot along an outer periphery, and the step of moving the pair of electrical rings includes aligning the ring passage of one of pair of electrical rings and the slot of another one of the pair of electrical rings to receive a connector pin.

21. The rectifier assembly as set forth in claim 4, wherein the first spring strip portion extends radially outwardly from an end of the second spring strip portion with respect to the assembly axis.

22. The generator as set forth in claim 14, wherein the first spring strip portion extends radially outwardly from an end of the second spring strip portion with respect to the longitudinal axis.

* * * * *